A. ECKSTEIN.
MACHINE FOR GRINDING SPECTACLE AND OTHER GLASSES.
APPLICATION FILED DEC. 24, 1910.

1,051,869.

Patented Feb. 4, 1913.
5 SHEETS—SHEET 1.

Witnesses:
John N. Hoving
R. Logan

Inventor:
ARNOLD ECKSTEIN
by H. van Oldenburg
Attorney.

A. ECKSTEIN.
MACHINE FOR GRINDING SPECTACLE AND OTHER GLASSES.
APPLICATION FILED DEC. 24, 1910.

1,051,869.

Patented Feb. 4, 1913.
5 SHEETS—SHEET 3.

WITNESSES:
David J. Walsh
Guy W. Hodges

INVENTOR
ARNOLD ECKSTEIN
BY
ATTORNEY

A. ECKSTEIN.
MACHINE FOR GRINDING SPECTACLE AND OTHER GLASSES.
APPLICATION FILED DEC. 24, 1910.

1,051,869.

Patented Feb. 4, 1913.

5 SHEETS—SHEET 4.

Witnesses:

Inventor:
ARNOLD ECKSTEIN
by
Attorney

A. ECKSTEIN.
MACHINE FOR GRINDING SPECTACLE AND OTHER GLASSES.
APPLICATION FILED DEC. 24, 1910.

1,051,869.

Patented Feb. 4, 1913.

5 SHEETS—SHEET 5.

Witnesses:
John H. Hoving
F. H. Logan

Inventor:
ARNOLD ECKSTEIN
by H. van Dedem
Attorney.

UNITED STATES PATENT OFFICE.

ARNOLD ECKSTEIN, OF PRAGUE, AUSTRIA-HUNGARY, ASSIGNOR OF ONE-HALF TO SEYBOTH & COMPANY, OF ZWICKAU, GERMANY.

MACHINE FOR GRINDING SPECTACLE AND OTHER GLASSES.

1,051,869. Specification of Letters Patent. Patented Feb. 4, 1913.

Application filed December 24, 1910. Serial No. 599,112.

*To all whom it may concern:*

Be it known that I, ARNOLD ECKSTEIN, a subject of the Austro-Hungarian Emperor, and resident of Prague, Bohemia, Austria-Hungary, have invented a certain new and useful Improvement in Machines for Grinding Spectacle and other Glasses, of which the following is a specification.

This invention refers to an edge grinding machine for grinding to templets the edges of glasses for optical purposes, such as oval spectacle glasses, which machine, while occupying little space and requiring small driving power, is very compact and demands little attention.

The improved machine is equipped with rotating superposed grind-stones and with work holding devices slidable on horizontal tables arranged coaxially with the grindstones, each work holder being adapted to receive a pile of glasses and being so constructed that the glasses may be readily removed and replaced by others at the proper time.

In the preferred form of the machine two superposed grind stones with two tables, each having eight work holders, are provided.

The machine is also provided with means for centering the piles of glasses to be ground and with an indicating device which obviates the necessity for continuous supervision of the progress of the grinding operation so that one operator may attend to two or more machines.

Other features and advantages will appear from the following description.

Figure 1:
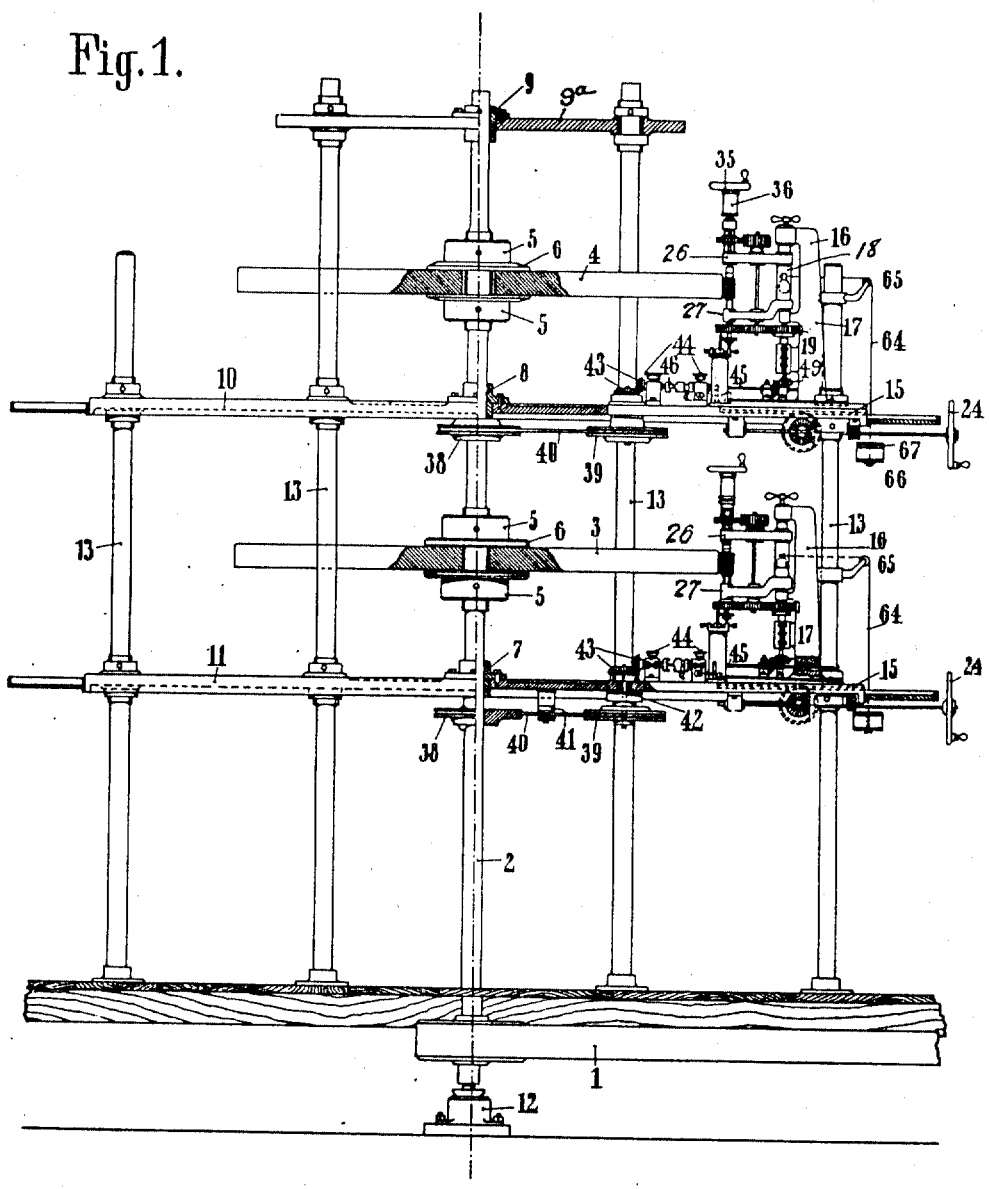
Figure 2:
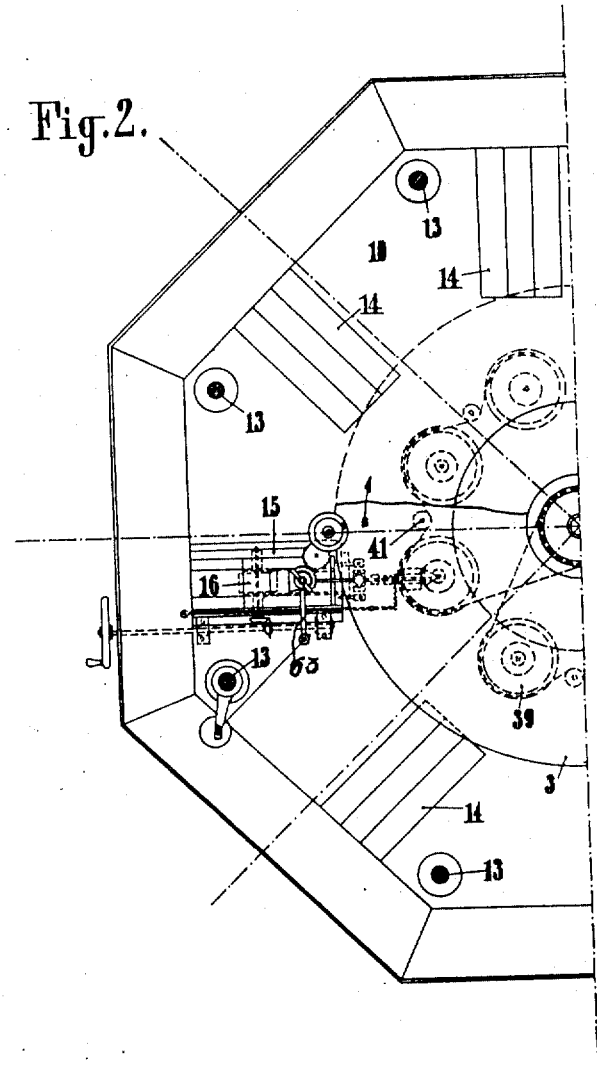
Figure 3:
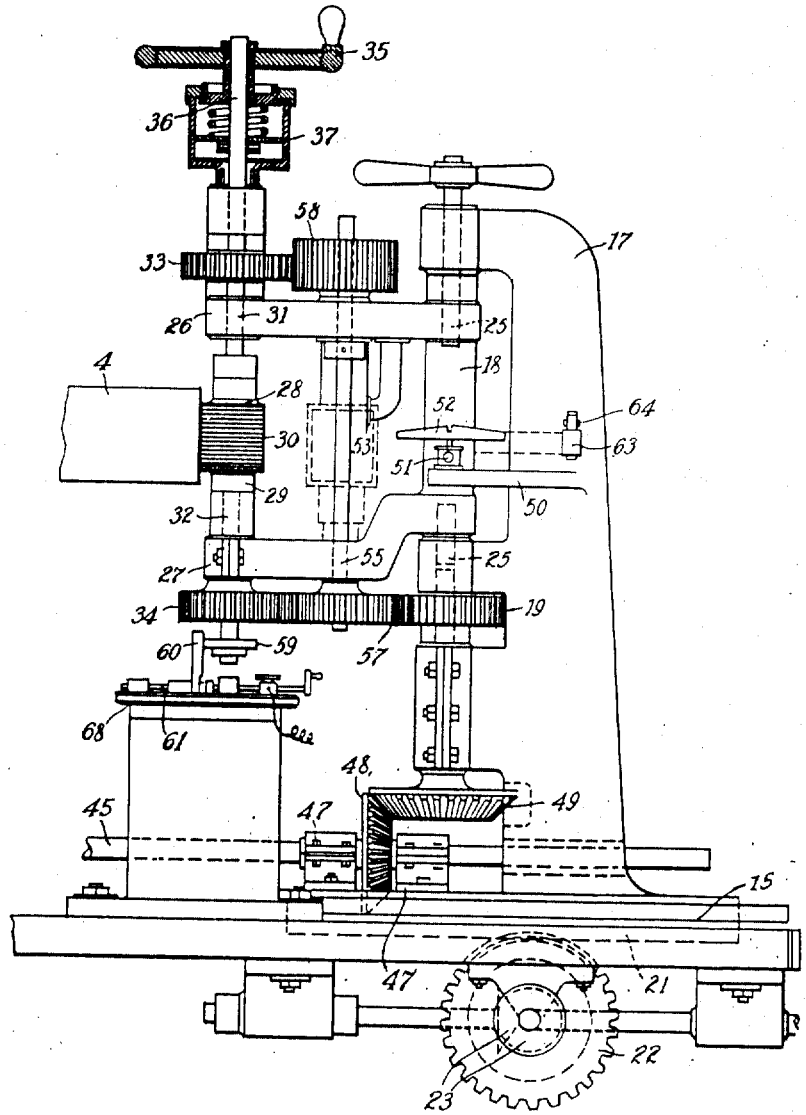
Figure 4:
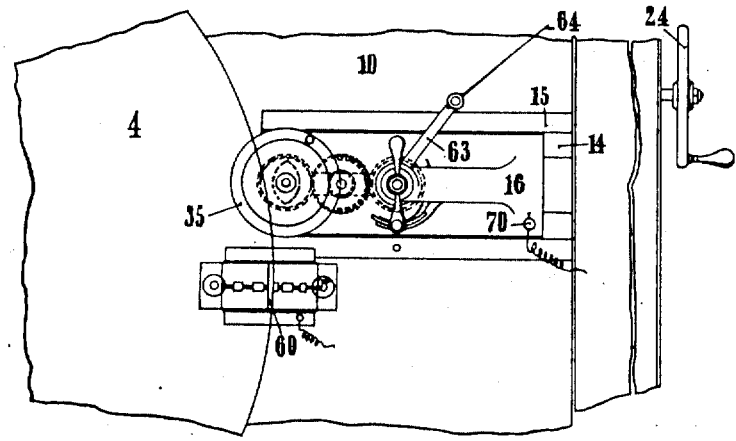
Figure 9:
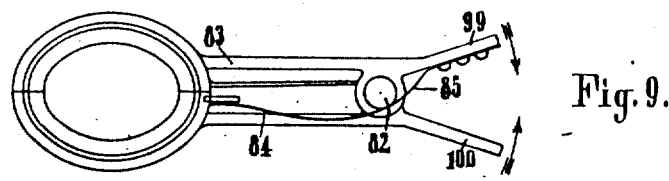
Figure 6:
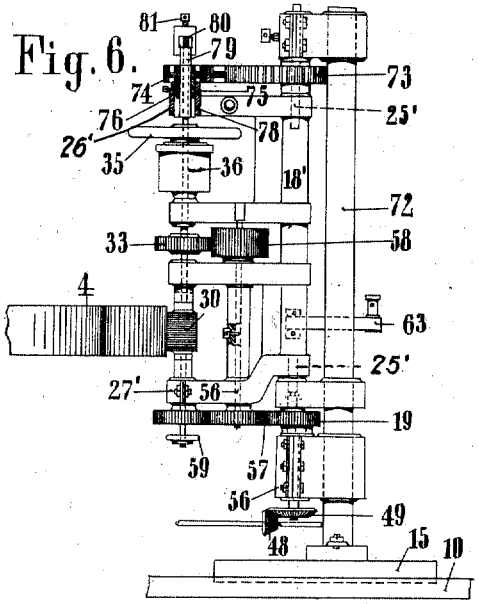
Figure 7:
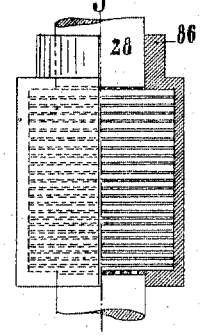
Figure 8:
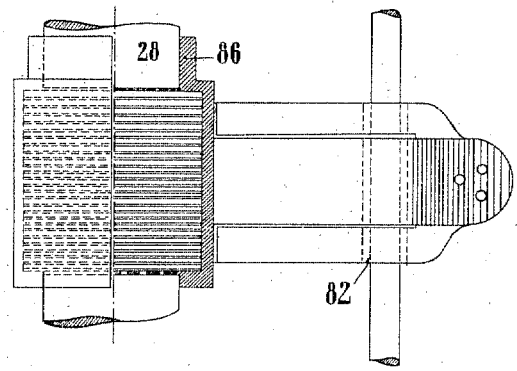
Figure 10:
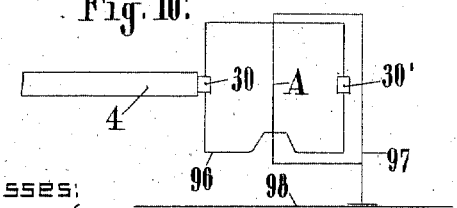
Figure 11:
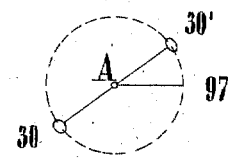

In the accompanying drawings which illustrate the invention, Figure 1 shows an elevation of a machine with two grind-stones and two tables, one work holder being shown on each table. Fig. 2 is a part plan of the machine; Fig. 3 is an elevation of a work holder to an enlarged scale; Fig. 4 is a plan and Fig. 5 a side elevation of Fig. 4. It may be remarked that, in Figs. 1, 3, 4 and 5, the work-holder is not shown in its operative position, viz:—approximately tangential to the grind-stone but in these figures is shown for the sake of clearness out of its normal working position. The actual operative position is indicated in Fig. 2. Fig. 6 shows a modified construction of work holder, a device for automatically opening and closing the clamping jaws being provided in this case. Figs. 7, 8 and 9 show the centering means in elevation and in section. Figs. 10 and 11 show diagrammatically in plan and elevation a work holder constructed on the turret principle.

Referring to the drawings, the vertical spindle 2 which is driven by a belt 1 arranged beneath the floor, carries the grindstones 3 and 4 which are secured upon the spindle by means of nuts 5 and washers 6; the spindle is supported in bearings 7, 8 on the tables 10 and 11 and also by a bearing 9 arranged on a cross bar 9ª, and by a footstep bearing 12. The tables 10 and 11 are braced by means of columns 13. Radial guide ways 14 corresponding in number to the number of work holders are provided upon the tables 10, 11. (In the present instance there are eight work holders for each table). Fitted to move in these guide ways are slides 15 carrying the work holders 17. Each work holder 17 comprises a rigid standard 16 and a frame formed by a sleeve 18 mounted on pivot pins 25 in said standard co-axially with pinions 19 and 49, horizontal arms 26, 27 on said sleeve and clamping jaws 28, 29, for the glasses 30 at the ends of said arms (Fig. 3). It will be understood that on angular movement of the said frame (26, 27, 18) the glasses will be brought into contact with the grind-stone, and on the actuation of a clutch 46 rotation is imparted to the spindle 20 and the clamping jaws, from the spindle 2 by means of an endless belt or cord drive as shown in Figs. 1 and 2.

Fig. 3 shows a portion of the horizontal grinding table 10 together with the slide 15 operated by means of a rack 21, a pinion 22, bevel gear 23, and a hand wheel 24, the work holder 17 for a pile of glasses being mounted on said slide 15.

The clamping jaws are secured to spindles 31, 32, upon which are mounted pinions 33, 34, which are driven by gear wheels 57, 58. In order to permit of the glasses 30 being clamped between the jaws which are lined with rubber, leather or cardboard disks, the upper spindle 31 is adapted to be raised by means of a screw-threaded spindle 36 provided with a hand wheel 35, against the action of a spring 37. In order to facilitate the interchanging and clamping of the glasses, the frame 18, 26, 27, may be held in position away from the grind-stone by a locking device 51, mounted on a bracket 50 at the side of the standard 16 (Fig. 3). This locking device comprises a cylindrical casing in which is located a spring-pressed plunger, carrying at its upper end a notched cross bar 52. A lug 53 rigidly secured to the arm 26 is adapted to engage with the notch in said cross bar 52 thereby securing the frame in position, the release being effected by means of an outwardly projecting pin on the plunger.

The spindle 32 carries at its lower end a templet 59 made of hardened metal and having the exact shape of the glasses to be ground. This templet contacts with a stop 60 when the grinding of the glasses 30 is completed, (Fig. 3) which stop 60 may be adjusted according to the wear of the grind-stone, by means of a micrometer screw 61. To press the glasses properly against the grind-stone when being ground, an arm 63 is fixed at 62 on one side of the sleeve 18, said arm carrying at one end a pin to which is secured a cord or wire 64 which is led over a pulley 65 and on which are suspended weights 66, 67. The pressure may be varied by addition or removal of weights.

Figure 5:
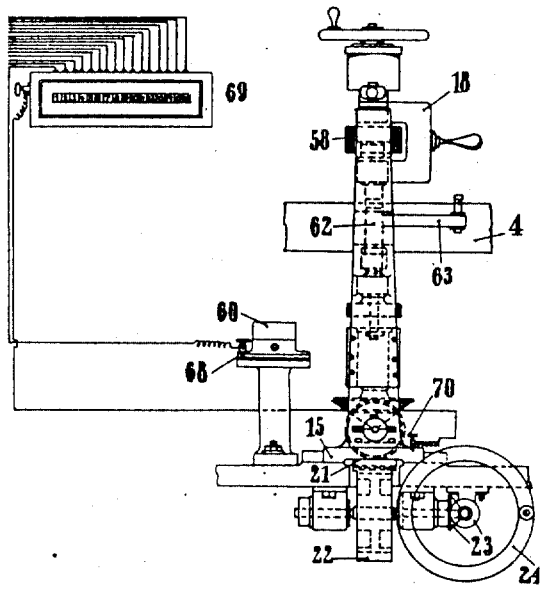

The arrangement of the electrical indicating device may be clearly seen from Fig. 5.

The stop 60 coöperating with the templet 59 is insulated from the table by means of a vulcanite sheet 68 and forms one end of an electrical circuit through one of the lamps of an indicator 69, while the other end of the circuit is formed by the terminal 70 on the slide of the work-holder. The lamps are disposed side by side and are separated by partitions. A small ground glass disk is placed in front of each lamp and on each is marked the indicating number of a corresponding work-holder. The circuit is therefore controlled by the stop 60; the operation being as follows: The clamped glasses 30 contact during the grinding operation with the stone so long as their diameter is greater than the templet and while the templet itself is at a distance from its stop. When the glasses are sufficiently ground, the templet will contact with the stop and close the electric circuit, causing the corresponding lamp to light. As soon as those portions of the edges of the glasses which still require to be ground are brought into contact with the stone by the rotation of the work holder, the templet is moved out of contact with its stop and the corresponding lamp is extinguished. The temporary illumination of a lamp therefore merely indicates that the glasses in a certain work-holder are sufficiently ground at some parts, the completion of the grinding operation being indicated by the permanent lighting of the lamp. The indicating device may be protected from daylight by a dark screen so as to render the indications of the lamps more prominent.

The *modus operandi* of the grinding machine shown is as follows: Each of the grind-stones 3 and 4, which are driven by the belt 1 coöperates in the present case with eight work-holders. Pulleys 39 are driven by means of a cord or belt drive 40 from the pulleys 38 on the spindle 2. These pulleys 39 transmit rotation by means of spindles 42 to the bevel gears 43 and thence through the shafts 45, mounted in bearings 47, to the bevel wheels 48, 49. Upon the spindle 25 of each wheel 49 is mounted the spur wheel 19 which transmits motion through the pinions 57, 58, which are mounted on an intermediate spindle 55, to the wheels 34, 33 and the spindles 32 and 31 of the clamping jaws 29, 28, thus rotating the glasses 30. A pile of glasses 30, the edges of which are to be ground is clamped between the clamping jaws, a device referred to below, serving to facilitate the centering of the glasses. The clamping is performed while the clutch 46 of the shaft 45 is in its disengaged position and the frame 26, 27, 18 is turned aside into a position in which it can be held by the locking device 51. After the glasses are clamped and the clutch 46 is brought into engagement the frame is released from the locking device 51 and turned slowly toward the stone whereupon the rotating glasses are automatically ground until the permanent illumination of the lamp corresponding to the particular work-holder indicates the completion of the grinding. Thereupon the frame 26, 27, 18, is again swung aside until it is engaged by the locking device 51, the clutch 46 is then disengaged and the glasses are released by the action of raising the spindle 36 by means of the hand wheel 35, so that the glasses may be easily withdrawn and replaced by a fresh set.

Fig. 6 shows a work-holder of a somewhat different construction, a wrought iron standard 72 being used in place of the standard 16, the upper one of the pivots 25' about which the frame 18', 26', 27' may be swung, carries a stationary toothed segment 73 engaged by a pinion 74. The latter is held in engagement with the boss 78 of the upper arm of the frame, by a screw which engages a groove 76 in the extended boss 75 of the pinion 74; the latter is threaded and through it passes a screw-threaded sleeve 79 which receives the spindle 36, the upper end of which is connected with the sleeve 79 by means of a screw 81 and bridge piece 80, in the manner of a boring machine spindle. In other respects the construction shown in Fig. 6 is similar to that previously described. When the frame 18', 26', 27' is swung aside for the purpose of interchanging the glasses, the pinion 74 is rotated relatively to the stationary toothed segment 73 and causes the screw-threaded sleeve 79, and thereby the spindle 36, to rise to a corresponding extent. The upper clamping jaw is thus raised and the glasses 30 are released.

The centering means Figs. 7, 8, 9, include two pivoted gripper arms 83, 84, connected with each other by a pin 82 and provided with curved jaws, a spring 85 tending to keep them in closed position. These jaws may hold a larger or smaller pile of glasses according to their width. Said curved jaws are also each provided with a projecting portion 86 of elliptical form which fits around the clamping jaws 28. A pile of rough glasses is inserted into the curved jaws of the centering device and if necessary the glasses are separated from one another by moist cardboard disks, whereupon said centering device is brought between the clamping jaws and the spindle 36 is lowered by manipulating the handle 35, thus clamping the glasses. Thereupon the centering device is opened by pressing the ends 99, 100, of the gripper arms together against the action of the spring 85, and can then be removed to one side. Each centering device is pivotally mounted upon the intermediate spindle 55 (as indicated in Figs. 3 and 8).

Figs. 10 and 11 show diagrammatically in plan and elevation a so-called turret arrangement of work-holder, the holder being in this case rotatable on the axis A. 4 denotes the grind-stone, 30 the glasses to be ground, 96 the frame rotatable about the axis A, 97 the standard and 98 the supporting table. While the glasses 30 are being ground a fresh set of glasses may be inserted in the other clamping members of the turret frame as at 30¹, and, upon rotation of the frame, these may in turn be brought into contact with the grind-stone.

With the grinding machines shown in Figs. 1, 2, 3, 4, 5, so-called "invisible" glasses may be ground by the use of a grind-stone having a wedge-shaped edge, or by the use of a suitable metal disk.

Having now described my invention what I claim and desire to secure by Letters Patent of the United States is:—

1. In a machine for grinding the edges of glasses, the combination of a vertical drive-shaft; a grind-stone thereon and having a peripheral grinding face, a work table; a plurality of standards substantially radially slidably mounted on the work-table and arranged at various positions all around the grind-stone; a frame pivotally mounted on each standard; a rotating spindle on the outer part of said frame; means for clamping a pile of glasses thereon coaxial with the spindle and parallel to the axis of the grind-stone; means adapted for rotating the spindle whatever be the adjusted position of the frame and the standard, and manipulating means for each standard and disposed at the outer edge of the table where it is easy of access.

2. In a machine for grinding the edges of glasses, the combination of a vertical drive shaft; a grind stone thereon and having a peripheral grinding face, a work table; a plurality of standards radially slidably mounted on the work-table and arranged therearound; a rack at the lower part of each standard; a frame pivotally mounted on each standard; a rotating spindle on the outer part of said frame; means for clamping a pile of glasses thereon coaxial with the spindle and parallel to the axis of the grind-stone; means for rotating the spindle in any operative position thereof; a templet on said spindle; an adjustable stop adapted to be engaged by the templet; means for yieldably moving the frame to cause the glasses to engage said face or the templet to engage the stop; a pinion for engaging said rack; and means located beyond the edge of the table for operating the pinion.

3. In a machine for grinding the edges of glasses, the combination of a drive-shaft; a grind-stone thereon and having a cylindrical peripheral grinding face; a work-table substantially perpendicular to the drive-shaft and provided with a slide-way approximately radial to the drive-shaft; a standard adjustable in said slide-way; a frame pivotally mounted on said standard and pivotally movable on an axis parallel to said shaft; a pair of coaxial rotatable spindles on the outer part of said frame and parallel with said shaft; a slidable spindle in one of said rotatable spindles; jaws on said slidable spindle and the opposite rotatable spindle; a spring pressing in said slidable spindle for clamping the jaws together; means for separating the jaws; a rotatable gear coaxial with said axis; an operative connection between said shaft and rotatable gear adapted for rotating the gear for any position of the standard in the slide-way; a gear-connection between one of the said spindles and said rotatable gear; means for moving the frame to cause the pile of glasses to press against said peripheral grinding face; a templet on the lower end of the lower spindle; and a stop adapted to be engaged by the templet.

4. In a machine for grinding the edges of glasses, the combination of a vertical drive-shaft; a plurality of grind-stones thereon and having a cylindrical peripheral grinding face; horizontal work-tables one for each grind-stone and provided with a plurality of slide-ways approximately radial to the drive-shaft; a standard slidable in each slide-way; a frame pivotally mounted on said standard and pivotally movable on an axis parallel to said shaft; a pair of coaxial rotatable vertical spindles on the outer part of said frame and adapted to clamp a pile of glasses therebetween; a rotatable spur gear coaxial with said axis; radial spindles operated from said shaft; bevel gears slidable on said spindle as said standard moves; an operative connection between said bevel gear and said spur gear; a gear connection between one of said vertical spindles and said rotatable spur-gear; means for moving the frame to cause the pile of glasses to press against said peripheral grinding face; a templet on the lower end of the lower spindle; a stop adapted to be engaged by the spindle; a rack on each of said standards; a radial adjusting rod under each table; adjusting gears on each adjusting rod; and intermediate gears engaging said rack and the adjusting gears.

In testimony whereof I have signed my name to this specification in the presence of two subscribing witnesses.

ARNOLD ECKSTEIN.

Witnesses:
GEORG ECKSTEIN,
ADOLPH FISCHER.